(12) United States Patent
Giannopoulos et al.

(10) Patent No.: US 6,510,066 B2
(45) Date of Patent: Jan. 21, 2003

(54) SWITCH MODE POWER SUPPLY AND METHOD FOR TRANSFERRING DATA ACROSS A POWER TRANSFORMER

(76) Inventors: Demetri Giannopoulos, 15 Derby Rd., Norwalk, CT (US) 06854; Qiong Li, 27 Greenlawn Rd., Cortlandt Manor, NY (US) 10567; Nai-Chi Lee, 81 Fairview Pl., Cortlandt Manor, NY (US) 10567

(*) Notice: Subject to any disclaimer, the term of this patent is extended or adjusted under 35 U.S.C. 154(b) by 0 days.

(21) Appl. No.: 09/822,401

(22) Filed: Mar. 30, 2001

(65) Prior Publication Data

US 2002/0141210 A1 Oct. 3, 2002

(51) Int. Cl.⁷ .................................................. H02M 3/24
(52) U.S. Cl. ...................................... 363/97; 363/21.01
(58) Field of Search ........................... 363/20, 21.01, 363/21.12, 21.04, 95, 97, 131

(56) References Cited

U.S. PATENT DOCUMENTS 5,715,104 A * 2/1998 Takada et al. ................. 360/15
5,798,913 A    8/1998 Tiesinga et al. .............. 363/21

FOREIGN PATENT DOCUMENTS

DE          4407529 C1    6/1995    ............ H02M/3/28

OTHER PUBLICATIONS

Patent Abstracts of Japan; vol. 012, No. 106, Apr. 6, 1988, JP 62235862.

* cited by examiner

*Primary Examiner*—Adolf Deneke Berhane
(74) *Attorney, Agent, or Firm*—Steven R. Biren

(57) ABSTRACT

A switch mode power supply (SMPS) and method are provided. In particular, the present invention provides an SMPS in which data is encoded by manipulating voltage pulses on a primary side. The manipulated voltage pulses are then transferred over a transformer to a secondary side. Secondary side pulses generated in response to the primary side pulses are sensed and decoded by a detector. The present invention allows data to be transferred from the primary side to the secondary side without affecting output voltages.

11 Claims, 9 Drawing Sheets

SWITCH MODE POWER SUPPLY AND METHOD FOR TRANSFERRING DATA ACROSS A POWER TRANSFORMER

BACKGROUND OF THE INVENTION

1. Technical Field

The present invention generally relates to a switch mode power supply (SMPS) and method. In particular, the present invention relates to an SMPS in which data is encoded by manipulating voltage pulses on a primary side of the SMPS, and then transferred to a secondary side across a transformer.

2. Background Art

In televisions, computer monitors, and other main powered devices, off-line switch mode power supplies (SMPS) are often used to transfer power to DC-isolated outputs. A typical SMPS includes a primary side and a secondary side, which are separated by a transformer. In general, the primary side includes a main power source and a controller, while the secondary side generally includes outputs (e.g., a main load, a microprocessor), and a receiver. Due to regulations, the SMPS outputs should be isolated from the main power source (i.e., the outputs should be DC-isolated). An optocoupler could also be provided for transferring feedback from the secondary side to the primary side. The receiver could be an IR receiver that receives a data signal from a remote control and communicates the received signal to the microprocessor for carrying out a user's command. However, since the receiver needs to receive power at all times (even in stand-by mode), the positioning of the receiver on the secondary side requires power to be constantly transferred from the primary side. Such a configuration is highly inefficient in stand-by mode.

Heretofore, many have attempted to alleviate some of these drawbacks by including a stand-by power source controller on the primary side of the SMPS. The stand-by controller allows power to be transferred over a separate transformer solely to the microprocessor and receiver. This allows the main load output to remain off-line (i.e., without power) in stand-by mode and, thus, increases the overall efficiency of the SMPS. However, this still requires transfer of power to the receiver to occur from the primary side to the secondary side. Moreover, because an additional transformer is required, such a configuration is costly.

Another attempt to alleviate some of the drawbacks is described in U.S. Pat. No. 5,798,913 to Tiesinga et al, herein incorporated by reference. Under the configuration of Tiesinga et al., data is transferred across a transformer. However, by transferring data in the manner taught by Tiesinga et al., a linear voltage regulator is required so that the output voltages are not affected. Such a requirement is both inefficient and costly.

In view of the foregoing, there exists a need for an SMPS whereby data and power can be efficiently transferred to the secondary side without disturbing the output voltages. In addition, a need exists for such an SMPS, wherein the receiver is positioned on the primary side to obviate the need to power the receiver over the transformer. A further need exists for such an SMPS that provides adequate isolation between the outputs and the main power source.

SUMMARY OF THE INVENTION

The present invention overcomes the drawbacks of existing systems by providing an SMPS and method for transferring data across a power transformer, without affecting the output voltages. In general, the SMPS and method of the present invention encodes data by manipulating pulses generated on the primary side. The encoded data is then transferred to the secondary side, over the transformer, where secondary side pulses containing the encoded data are generated in response to the primary side pulses. The secondary side pulses are then sensed and decoded.

According to a first aspect of the present invention, a switch mode power supply (SMPS) having a primary side and a secondary side separated by a transformer are provided. The SMPS comprises: (1) a controller that regulates the generation of pulses on the primary side; and (2) an encoding system for encoding data by changing a frequency of a set of the pulses on the primary side.

According to a second aspect of the present invention, a switch mode power supply (SMPS) is provided. The SMPS comprises: (1) a primary side including a main power source, a controller, and a receiver, wherein the controller regulates the generation of pulses on the primary side and encodes data by changing a pulse width for a set of the pulses; (2) a secondary side for receiving power and the encoded data from the primary side, wherein the secondary side includes a main load, a microprocessor, and a detector, and wherein the detector senses the encoded data by detecting manipulations in secondary side pulses generated in response to the primary side pulses; and (3) a transformer separating the primary side from the secondary side.

According to a third aspect of the present invention, a method for transferring data from a primary side to a secondary side of a switch mode power supply (SMPS) is provided. The method comprising the steps of: (1) changing a width of pulses on the primary side to encode data; (2) transferring the encoded data to the secondary side; (3) sensing the encoded data on the secondary side; and (4) decoding the encoded data.

Therefore, the present invention provides an SMPS and method. The present invention reduces the problems associated with existing systems set forth above.

BRIEF DESCRIPTIONS OF THE DRAWINGS

These and other features and advantages of this invention will be more readily understood from the following detailed description of the various aspects of the invention taken in conjunction with the accompanying drawings in which.

Figure 1:
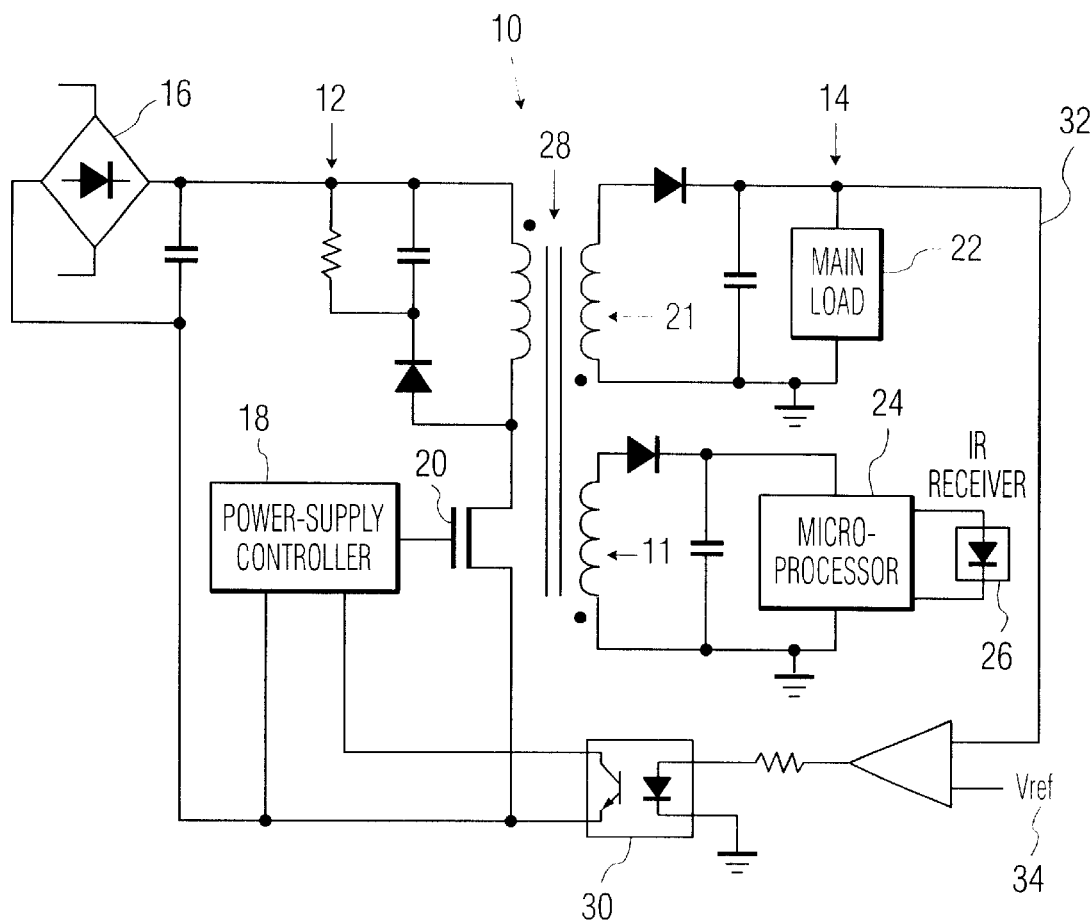
FIG. 1 depicts a first related art SMPS.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

Referring now to FIG. 1, a related-art switch mode power supply (SMPS) 10 is depicted. The SMPS 10 includes primary side 12 and secondary side 14 separated by transformer 28 and opto-coupler 30. Transformer 28 and opto-coupler 30 are well known to those of ordinary skill in the art and allow for power and feedback to be transferred between primary side 12 and secondary side 14. As shown, primary side 12 generally includes main power source 16, controller 18, and switch 20. Controller 18 causes switch 20 to open and close to allow for power to be transferred across transformer 28 to secondary side 14. Secondary side 14 includes windings 11 and 21, outputs (i.e., main load 22 and microprocessor 24), and feedback signal 32. Coupled directly to microprocessor 24 is a receiver 26 such as an IR receiver. Feedback signal 32 is included for providing feedback to primary side 12 via opto-coupler 30. In addition, a reference voltage 34 could be used in conjunction with feedback signal 32 for regulation of the output voltages.

Transformer 28 and opto-coupler separate primary side 12 and secondary side 14 because it is vital for main load 22 and microprocessor 24 to receiver power while being isolated from main power source 16. Since receiver 26 must communicate data signals received from an external source (e.g., a remote control) to microprocessor 24, the SMPS 10 of FIG. 1 shows receiver 26 positioned on secondary side. As indicated above, the configuration of SMPS 10 is highly inefficient in stand-by mode because power must be constantly transferred across transformer 28 to power receiver 26.

Figure 2:
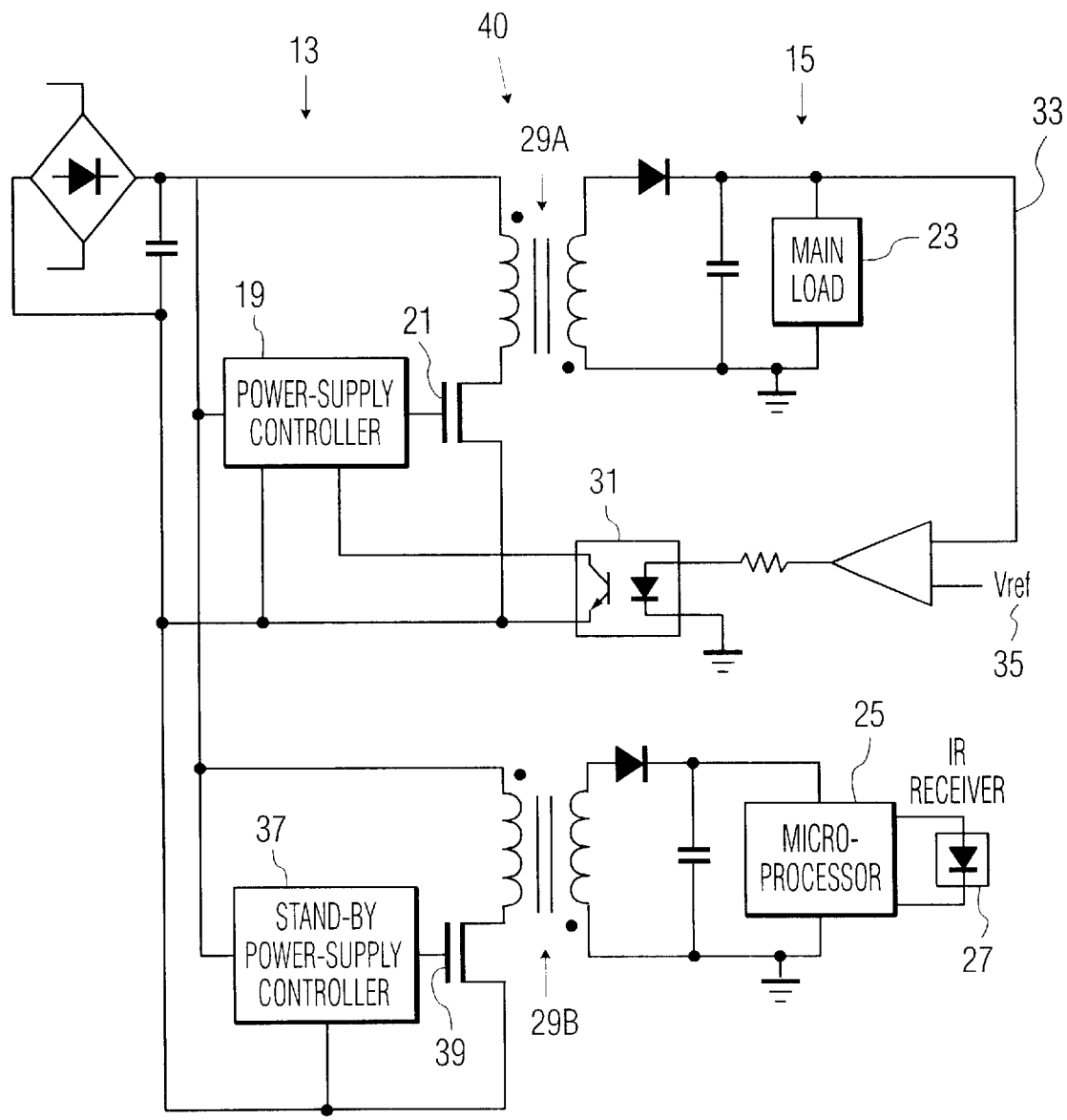
FIG. 2 depicts a second related art SMPS.

FIG. 2 shows a second related art SMPS 40 comprising primary side 13 and secondary side 15, which are separated by transformers 29A and 29B and opto-coupler 31. Receiver 27 is positioned on secondary side 15, but is powered separately from main load 23, in contrast from SMPS 10. Specifically SMPS 40 includes two controllers 19 and 37 and two transformers 29A and 29B. Controller 19 controls switch 21 to allow for power to be transferred over transformer 29A to main load 23 while controller 37 controls switch 39 to allow for power to be transferred to microprocessor 25 and receiver 27 over transformer 29B. This configuration allows receiver 27 to constantly receive power and remain in standby mode separately from main load 23. As described above, if receiver 27 is not constantly powered, signals will not be received and communicated to microprocessor 25. For example, if receiver 27 is left un-powered, a user's remote control command to turn on the television will not result in the television being turned on. Accordingly, under SMPS 40, microprocessor 25 and receiver 27 will always be powered while main load 23 can remain un-powered or off-line.

As explained above, however, SMPS 40 requires an additional transformer 29B and controller 37, which adds expense. Moreover, since receiver 27 remains directly coupled to microprocessor 25, both components must always be powered. However, receiver 27 is the only component that requires constant power. Thus, the additional inefficiency of constantly providing power to microprocessor 25 results.

Figure 3:
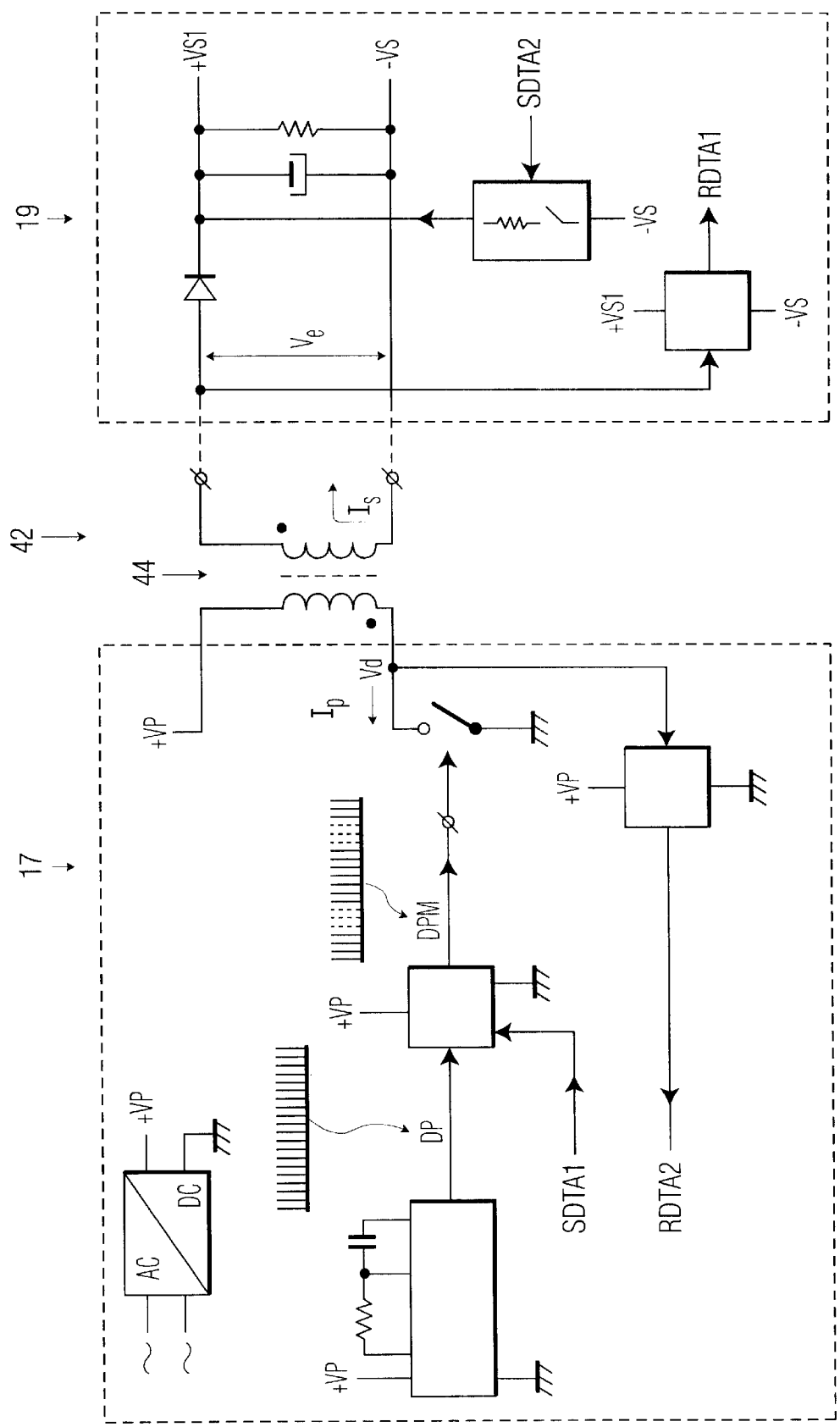
FIG. 3 depicts a third related art SMPS.

FIG. 3 shows an SMPS 42 according to U.S. Pat. No. 5,798,913 to Tiesinga et al. (incorporated by reference above). As depicted, SMPS 42 includes primary side 17 and secondary side 19, which are separated by transformer 44. Under Tiesinga et al., data is transferred from primary side 17 to secondary side 19 across transformer 44. However, transfer of data under the configuration taught by Tiesinga et al. requires a linear voltage regulator (not shown) so that the final output voltages are not affected.

Figure 4:
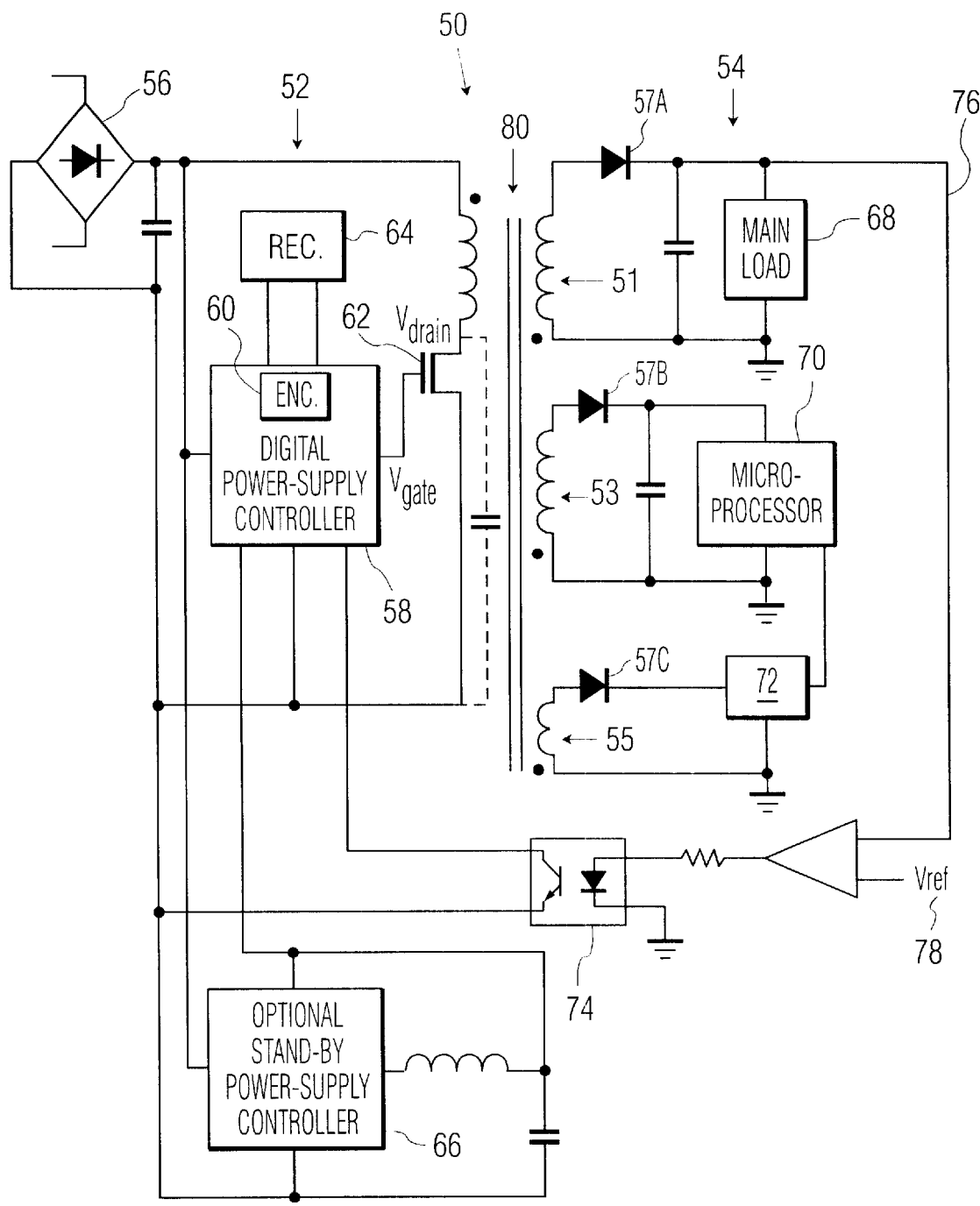
FIG. 4 depicts an SMPS according to the present invention.

Referring now to FIG. 4, an SMPS 50 according to the present invention is shown. As depicted, SMPS 50 includes primary side 52 and secondary side 54. Primary side 52 generally comprises main power source 56, controller 58, receiver 64, and optional stand-by power-supply controller 66. Receiver 64 is preferably a wireless interface such as an IR or RF receiver. However, it should be appreciated that other methods of data input could be utilized. Secondary side 54 generally comprises three windings 51, 53, and 55, diodes 57A–57C, main load 68, microprocessor 70 (outputs), detector 72, and feedback signal 76 that can be compared to a reference voltage 78. In addition, transformer 80 and opto-coupler 74 are provided so that signals (power, data, feedback, etc.) can be transferred between primary side 52 and secondary side 54 while keeping the outputs (i.e., main load 68 and microprocessor 70) isolated from main power source 56.

It should be understood that although a specific configuration of SMPS 50 has been shown and described, other variations could exist. For example, SMPS 50 could include additional outputs, or winding 55 could be shared with winding 53. Moreover, it should be understood that stand-by power-supply controller 66 is optional and is shown for exemplary purposes only. When included, stand-by power-supply controller 66 could provide power to receiver 64. However, when stand-by power-supply controller 66 is not included in SMSP 50, controller 58 would provide the power to receiver 64.

As explained above, receiver 64 requires constantly provided power so that signals can always be received from an external source such as a remote control. By positioning receiver 64 on primary side 52, as opposed to secondary side 54, receiver 64 can be powered without transfer across transformer (i.e., separately from main load 68 and microprocessor 70) and without disturbing the output voltages. However, by positioning receiver 64 on primary side, data must be transferred across transformer 80 to microprocessor 70. The above-described configuration of SMPS 50 allows both power and data to be efficiently transferred from primary side 52 to main load 68 and microprocessor 70. Specifically, when data is to be transferred from receiver 64 to microprocessor 70, encoder 60 will encode the data into the power signal generated on the primary side, which will be transferred over transformer 80 to secondary side 54. Once received on secondary side, detector 72 will sense the presence of the encoded data and decode the same.

A data set can be encoded using any means known in the art. For example, the data set could be encoded by manipulating pulses in the voltage signal coming from main power source 56. Specifically, in operation, controller 58 opens and closes switch 62 to generate pulses on primary side 52. Then, encoder 60 will manipulate a set of the generated pulses according to a predetermined "code" to encode the data set. In a first preferred embodiment, encoder 60 will change a frequency/width of a set (or sets) of the generated pulses, and then assign each pulse frequency/width a value. The value assigned to each frequency/width is based on the predetermined code. The encoded data will then be transferred over transformer 80 to secondary side 54. Secondary side pulses will then be generated in response to the manipulated primary side pulses. Detector 72 will sense the secondary side pulses and decode the data according to the predetermined code to identify the values assigned to each pulse frequency/width.

In this embodiment, detector 72 is connected to winding 55 and is preferably a variable pulse-width detector (as will be described in further detail below). Alternatively, detector 72 could be a frequency detector that detects and decodes data based on pulse frequency. It should be understood that each set of pulses manipulated preferably includes a plurality of sequential pulses. However, it should be understood that a set could include one or zero pulses.

Figure 5:
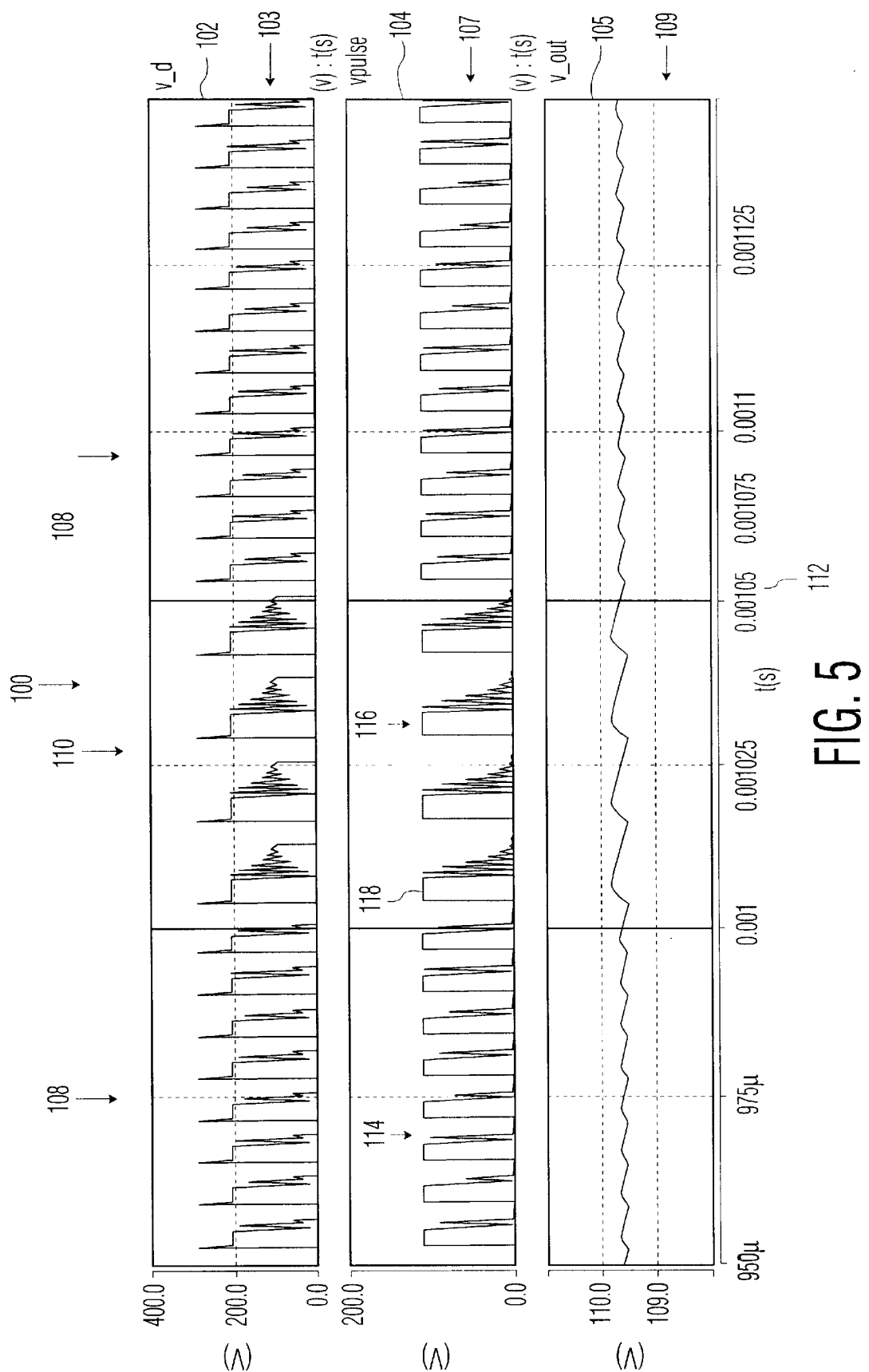
FIG. 5 depicts a graph of pulse frequency over time according to the present invention.

Referring now to FIG. 5 an exemplary graph 100 depicting pulse frequency over time is shown. In particular, curve 102 depicts the voltage at the drain of switch 62 in discontinuous conduction mode versus time (i.e., the primary side pulses). Curve 104 depicts pulse voltage versus time (i.e., the secondary side pulses that are generated in response to the primary side pulses). Curve 105 depicts the voltage at the outputs versus time. As can be seen, the secondary side pulses 107 of curve 104 closely mirror the primary side pulses 103 of curve 102. For clarity purposes, the curves 102, 104, and 105 are broken into sets 108 and 110. Set 108 refers to a first higher pulse frequency, while set 110 refers to a second lower pulse frequency.

While switch 62 of FIG. 4 is being opened and closed by controller 58 to create voltage pulses, encoder 60 will vary the frequency of a set of pulses at predetermined times. For example, as shown in FIG. 5, the frequency of the voltage pulses 103 and 107 decreases during set 110 (i.e., from time=0.001 seconds to 0.00105 seconds) relative to set 108. As depicted in curve 104, set 108 has approximately eight pulses 114 while set 110 has approximately four pulses 116 for the same period of time. Consequently, because fewer pulses 116 appear over the same time interval as pulses 114, pulses 116 are wider than pulses 114 so that the average energy transfer can be maintained at the same level. That is, each pulse 116 of set 110 last for a longer duration than each pulse 114 of set 108 so that both sets 108 and 110 have comparable average energy transfer. Therefore, there is generally no increase or decrease in average energy transfer when data is encoded and transferred from the primary side to the secondary side. Moreover, because the ripples 109 of output voltage curve 105 closely mirror the primary side pulses 103 of curve 102, it can be seen that the transfer of data from the primary side to the secondary side does not affect the output voltage.

The decrease in pulse frequency from time=0.001 to 0.00105 seconds could signal a starting point 112 for an encoded data set. Thus, when detector senses the secondary side pulses, it will begin to look for data to decode at time=0.00105 seconds. The data set can be encoded and decoded in any number of known ways. For example, after the starting point 112, a value could be assigned to each pulse depending on its width or frequency. Thus, after the starting point 112, a pulse having the decreased frequency of pulses 116 could be assigned a value of 1, while a pulse having the increased or regular frequency of pulses 114 could be assigned a value of 0 (or vice versa).

Figure 6:
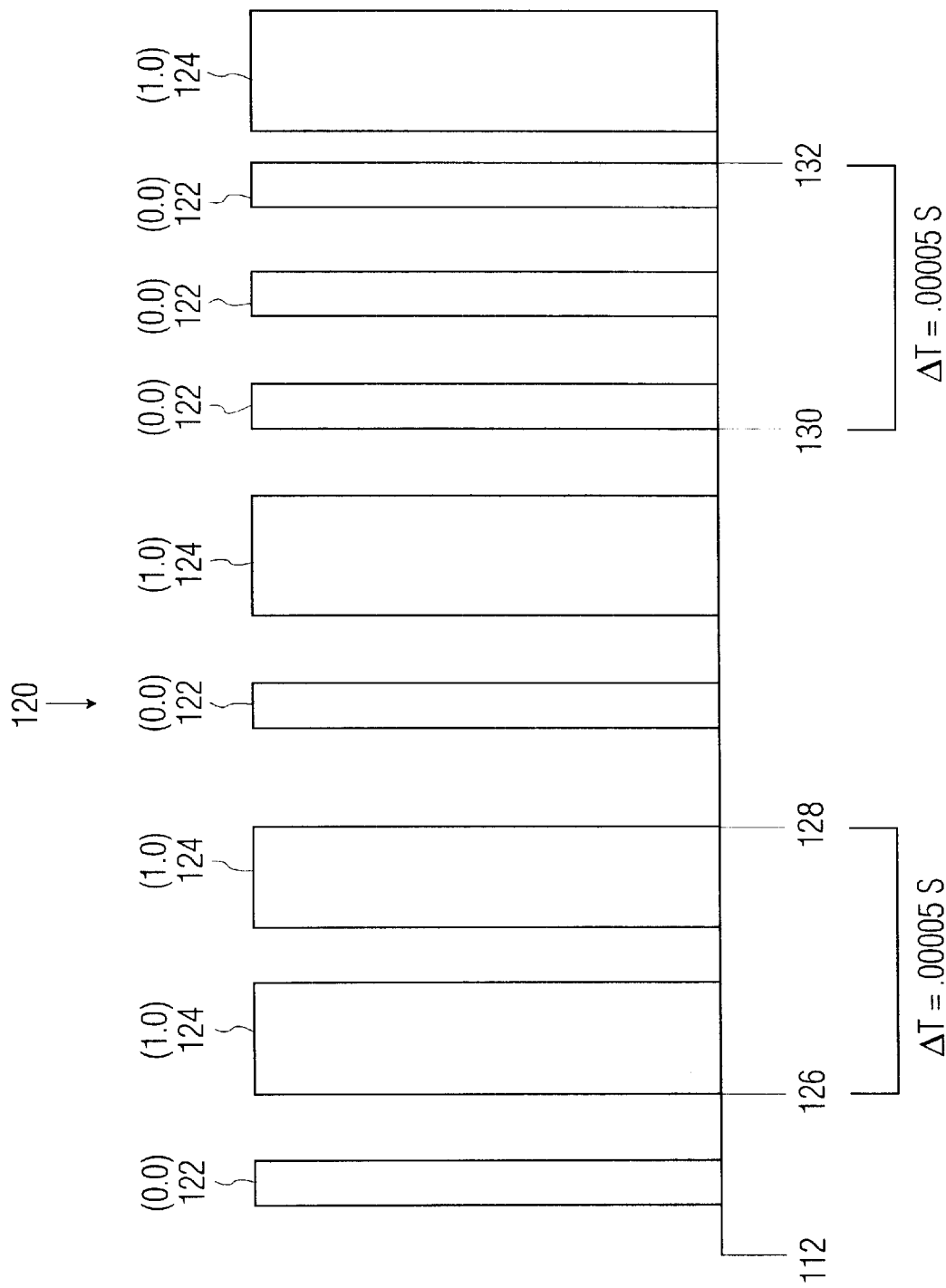
FIG. 6 depicts data encoded according to pulse frequency/width according to the present invention.

FIG. 6 shows this concept in greater detail. Specifically, FIG. 6 depicts a set of pulses 120 having data encoded according to pulse frequency/width. As shown, after starting point 112, pulses 122 have a smaller width that pulses 124. This is demonstrated by the fact that two pulses 124 appear between points 126 and 128 while three pulses 122 appear between points 130 and 132. Since this difference in pulse quantity occurs over an identical time interval (e.g., 0.00005 seconds), the frequency of pulses 124 is less than that of pulses 122. Moreover, pulses 124 are wider than pulses 122. To encode/decode the data, pulses 124 having a greater width could be assigned a value such as 1 while pulses 122 having a smaller width could be assigned a value such as 0. Thus, using the data values assigned to each pulse for the example shown in FIG. 6, the data set comprises nine bits. Specifically, the data set comprises the bits 011010001. It is important to note that the precise value assigned to the pulses is not essential. Rather an important feature of this system and method is that the values be based on pulse frequency/width.

As indicated above, various codes for encoding/decoding data based on pulse frequency/width exist. For example, data could be encoded/decoded by assigning values only to certain pulses (e.g., every $4^{th}$ pulse) after the starting point 112. Moreover, the starting point 112 could be when a change is pulse frequency first occurs. Thus, instead of the data set beginning after the set 110 of FIG. 5, the data set could begin with the first pulse 118 of set 110. In this case, first pulse 118 serves both as the starting point and the beginning of the data set. Regardless of what code is used by encoder 60 to encode the data set, detector 72 will use the same code to decode the data set.

Figure 7:
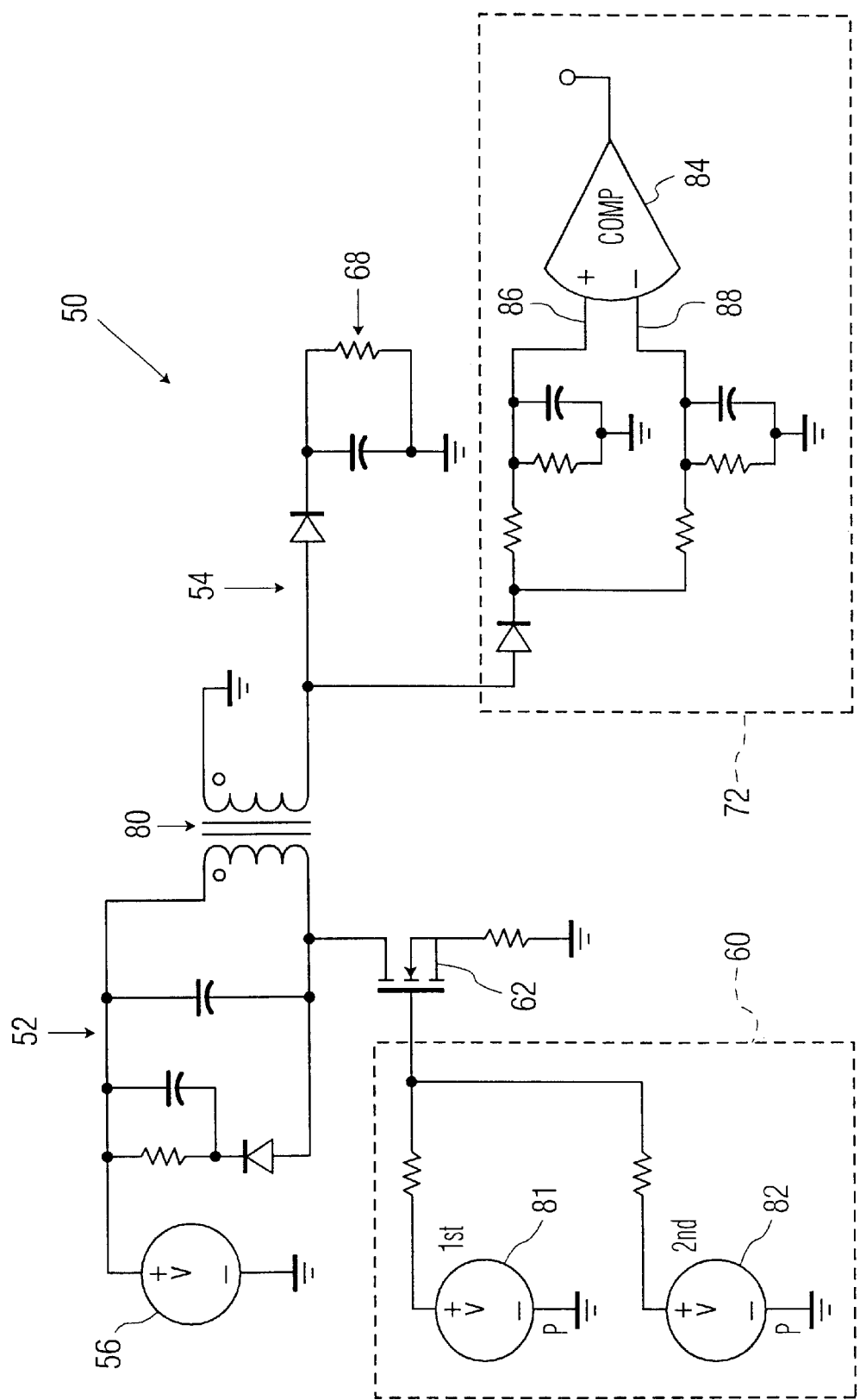
FIG. 7 depicts and SMPS having a variable pulse-width detector according to the present invention.

Referring now to FIG. 7, SMPS 50 having encoder 60 and variable pulse-width detector 72 for the embodiment described above are shown. Specifically, encoder 60 includes a first PWM (Pulse Width Modulator) controller 81 and a second PWM controller 82. Collectively, each PWM controller 81 and 82 will control switch 62 to change the frequency/width of the pulses according to the predetermined code (as described above). It should be understood, however, that encoder 60 is preferably a component of controller 58 as shown in FIG. 4. However, controller 58 is not shown in FIG. 7 for clarity purposes. As indicated above, the encoded data in the form of pulses will be transferred from primary side 52 over transformer 80. Pulses on secondary side 54 will then be generated in response thereto. The secondary side pulses will be sensed and decoded by detector 72. In this embodiment, detector 72 is positioned in third winding 55 and is preferable a variable pulse-width detector that detects changes in pulse frequency by detecting the width of each pulse. As indicated above, pulses with decreased frequency have an increased width and last for a longer duration (when compared to pulses of higher frequency). Accordingly, variable pulse width detector 72 preferably includes a comparator 84 for comparing a first time constant 86 to a second time constant 88 to determine pulse width. Once each pulse has been determined to be either a first width or a second width by comparator 84, the values assigned to each pulse width can be determined based on a predetermined encoding scheme or code.

It should be understood that two PWM controllers 81 and 82 have been shown for illustrative purposes only and other implementations exist. For example one PWM controller, which uses time to modulate pulse frequency, could be implemented. In addition, it should be understood that detector 72 could be a frequency detector instead of a pulse width detector. In this case, the encoded data set would be decoded based on pulse frequency. Moreover the positioning of detector 72 on third winding 55 is only one way to implement the present invention. Accordingly, other variations of detector 72 placement could be implemented.

This method of changing pulse frequency/width to encode data not only prevents the output voltage regulation from being affected, but also allows data transfer to occur at a high rate since transfer need not wait for the output voltages to recover before transferring the next data bit. Specifically, whenever a data bit is to be transferred, controller 58 will calculate a new switching frequency and pulse width (conduction time) for switch 62. For example, in continuous conduction mode operation if the circuit has switching frequency $fs_1$ and pulse width $Ton_1$ before the data is to be transferred, the new switching frequency $fs_2$ can be calculated as follows:

$$fs_2 = [Ton_1/Ton_2]^2 * fs_1$$

where $Ton_2$ is the new pulse width, which can be distinguished by the variable pulse-width detector in FIG. 7. By using the pre-calculated new switching frequency $fs_2$ and pulse width values, the primary side can send the same power to the outputs while transferring data to the secondary side, so the output voltage disturbance is minimized.

Figure 8:
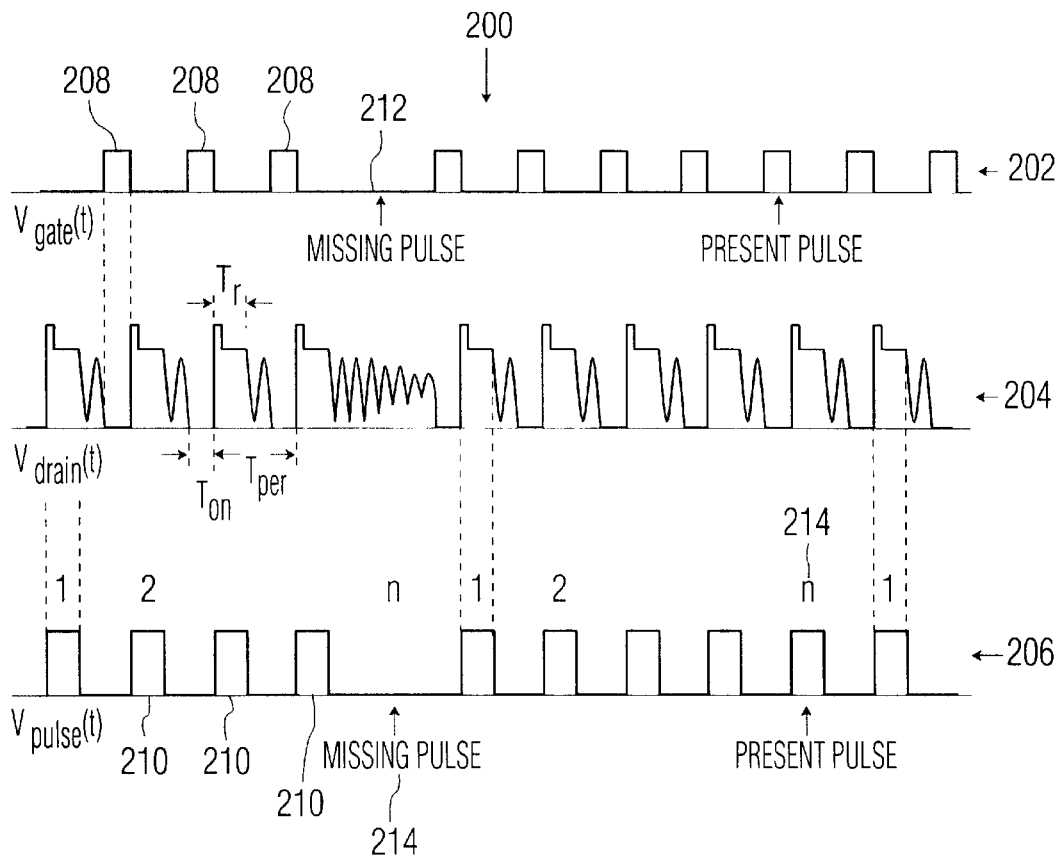
FIG. 8 depicts a graph of pulse presence over time according to the present invention.

In an alternative embodiment, pulses can be skipped to encode data. Referring to FIG. 8, a graph 200 of data encoded according to pulse presence is shown. In particular, graph 200 depicts three curves 202, 204, and 206. Curves 202 and 204 depict the gate and drain voltage, respectively, on switch 62 (of FIG. 4) in discontinuous conduction mode, in terms of voltage versus time. Curve 206 depicts pulse voltage for secondary side pulses 210 generated in response to primary side pulses 208, in terms of voltage versus time. As can be seen, when a primary side pulse is skipped 212, a secondary side pulse 214 is also skipped. This skipped pulse could be the starting point for an encoded data set (just as a frequency/width change was for the preferred embodiment described above). After the starting point, the data would be encoded according to the presence (or lack thereof) of pulses. For example, after the starting point, every pulse presence could be assigned a value. Specifically, if a pulse is present, a value of 1 could be assigned. Conversely, if a pulse is missing, a value of 0 could be assigned.

In referring to curve 204, during the switch-on time $T_{on}$, energy is stored in the magnetizing inductance of transformer 80 (FIG. 4) and no current flows through diodes 57, which are reversed biased. Following the switch turn-off, the stored energy is transferred to secondary windings 51, 53, and 55 for the duration of the core rest time $T_r$. At the end of $T_r$, the entire stored energy in transformer 80 has been transferred to main load 68 and microprocessor 70. In addition, during $T_r$, current flows through diodes 57. As described above, the presence of the $T_r$ can be detected on secondary side 54 by detector 72, which is preferably a pulse (presence) detector. As shown by curve 206, a pulse appears at $V_{pulse}$ (i.e., at detector 72 of FIG. 4) for the duration of the $T_r$. If a pulse of the switch gate drive $V_{gate}$ (curve 202) is omitted, then the output voltage remains zero and no pulse is observed for the duration of one switching cycle.

Figure 9:
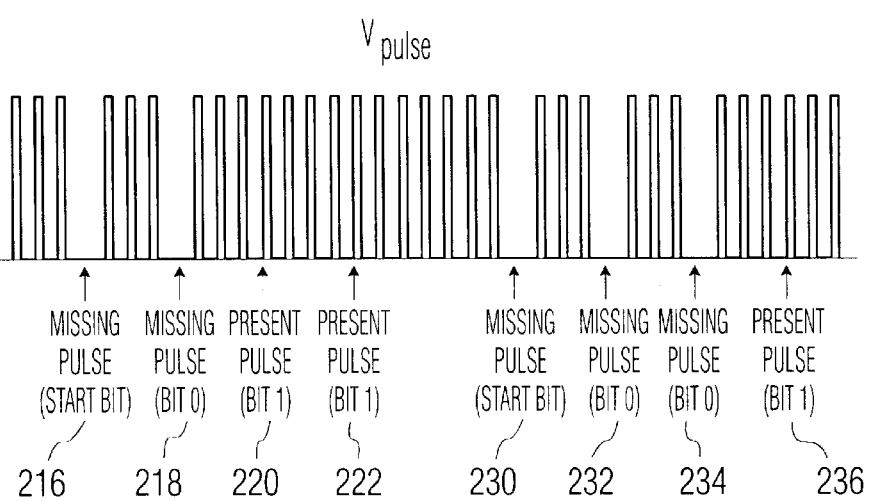
FIG. 9 depicts data encoded according to pulse presence according to the present invention.

Under this theory, data could also be encoded/decoded by counting every nth pulse after the starting point. For example, after the starting point, every fourth pulse could be assigned a value based on its presence (or lack thereof). An example of this alternative is shown in FIG. 9. After starting point 216, each fourth pulse is assigned a value. As shown, pulse 218 is missing and is assigned a value of 0, while pulses 220 and 222 are present and are each assigned a value of 1. Similarly, after starting point 230, pulses 232 and 234 are missing and are assigned a value of 0 while pulse 236 is present and is assigned a value of 1. Accordingly, the encoded data set shown in FIG. 9 comprises two, three bit data subsets of 011 and 001. As indicated above, the precise value assigned to each pulse presence is not essential and can vary.

Figure 10:
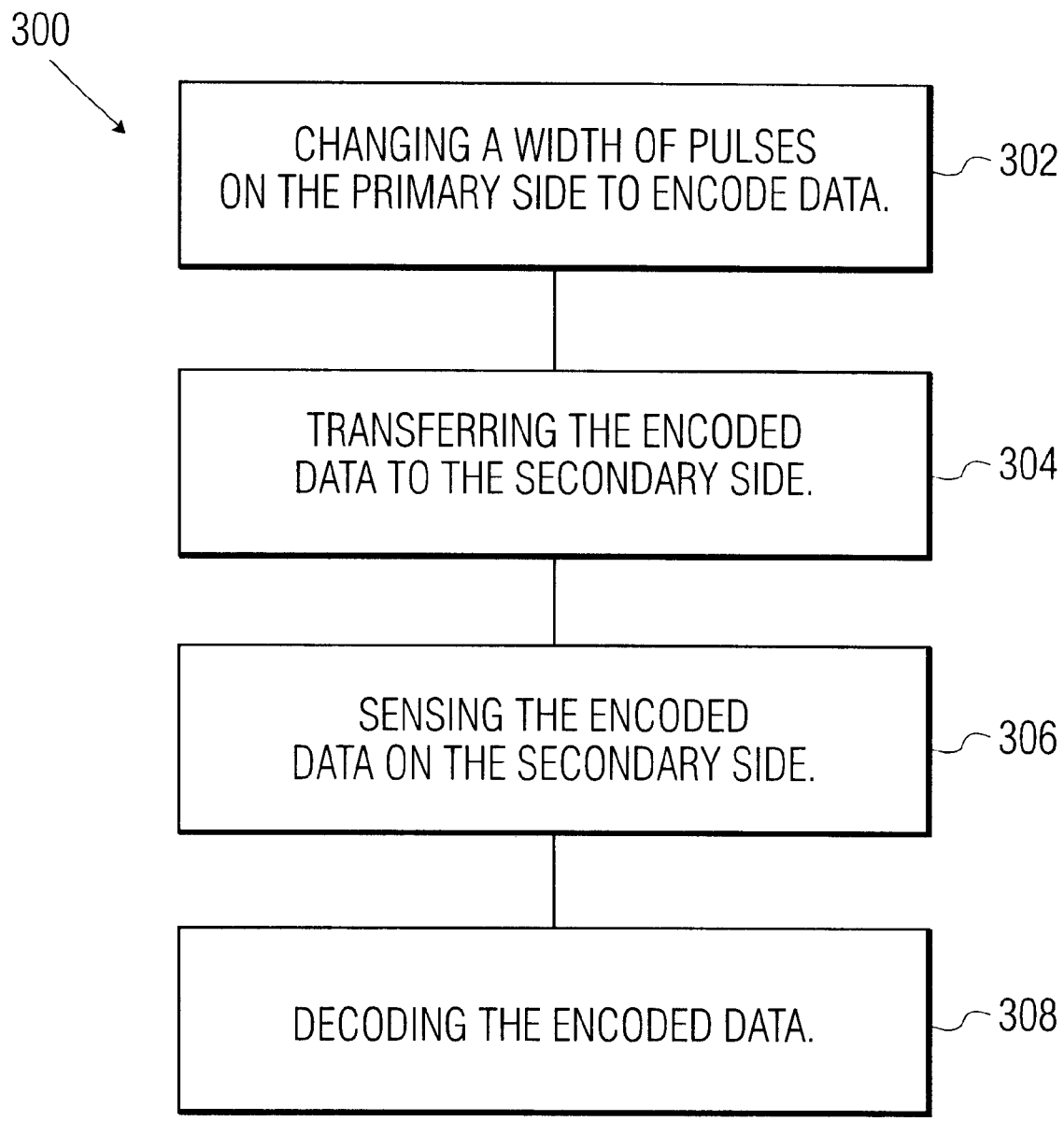
FIG. 10 depicts a method flowchart according to the present invention.

Referring now to FIG. 10, a method 300 for transferring data from a primary side to a secondary side of a switch mode power supply (SMPS) is shown. First step 302 is to change a width of pulses on the primary side to encode data. Second step 304 is to transfer the encoded data to the secondary side. Third step 306 of method 300 is to sense the encoded data on the secondary side. Fourth step 308 is to decode the encoded data.

Accordingly, under the teachings of the present invention, data is transferred from the primary side to the secondary side without disturbing the output voltages. This allows the receiver be positioned on the primary side and constantly receive power without having to provide power to any of the outputs.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A switch mode power supply (SMPS), comprising:
   a primary side including a main power source, a controller, and a receiver, wherein the controller regulates the generation of pulses on the primary side and encodes data by changing a pulse width for a set of the pulses;
   a secondary side for receiving power and the encoded data from the primary side, wherein the secondary side includes a main load, a microprocessor, and a detector, and wherein the detector senses the encoded data by detecting manipulations in secondary side pulses generated in response to the primary side pulses; and
   a transformer separating the primary side from the secondary side.

2. The SMPS of claim 1 further comprising an opto-coupler for separating the primary side from the secondary side.

3. The SMPS of claim 2, wherein the transformer and the opto-coupler separate the main power source from the main load and the microprocessor.

4. The SMPS of claim 1, wherein the width change results in a decrease in pulse width and an increase in pulse frequency.

5. The SMPS of claim 1, wherein the width change results in an increase in pulse width and a decrease in pulse frequency.

6. The SMPS of claim 1, wherein the detector is a variable pulse-width detector, and wherein the detector decodes the encoded data by detecting a change in width of the pulses.

7. The SMPS of claim 1, wherein the opto-coupler transfers feedback from the secondary side to the primary side.

8. A method for transferring data from a primary side to a secondary side of a switch mode power supply (SMPS), comprising the steps of:
   changing a width of pulses on the primary side to encode data;
   transferring the encoded data to the secondary side;
   sensing the encoded data on the secondary side; and
   decoding the encoded data, wherein the decoding step comprises the steps of:
   detecting a starting point of a data set;
   detecting a width of pulses generated on the secondary side in response to the pulses on the primary side; and
   assigning a data value based on the detected width.

9. The method of claim 8, wherein the changing step comprises the step of decreasing a width and increasing a frequency of a set of the pulses on the primary side to encode data.

10. The method of claim 8, wherein the changing step comprises the step of increasing a width of and decreasing a frequency of a set of the pulses on the primary side to encode data.

11. The method of claim 8, wherein the changing step further comprises assigning a value to each pulse width.

* * * * *

UNITED STATES PATENT AND TRADEMARK OFFICE
CERTIFICATE OF CORRECTION

PATENT NO.    : 6,510,066 B2                                              Page 1 of 1
DATED         : January 21, 2003
INVENTOR(S)   : Demetri Giannopoulos, Qiong Li and Nai-Chi Lee It is certified that error appears in the above-identified patent and that said Letters Patent is hereby corrected as shown below:

<u>Title page,</u>
Insert item -- [73] Assignee: Koninklijke Philips Electronics N.V., Eindhoven (NL) --.

Signed and Sealed this

Second Day of September, 2003

JAMES E. ROGAN
*Director of the United States Patent and Trademark Office*